UNITED STATES PATENT OFFICE.

PER GÖSTA EKSTRÖM, OF HARNÄS, SWEDEN, ASSIGNOR TO AKTIEBOLAGET ETHYL, OF FALUN, SWEDEN.

MANUFACTURE OF ETHYL ALCOHOL BY FERMENTING SULFITE LIQUOR.

1,046,160.           Specification of Letters Patent.        Patented Dec. 3, 1912.

No Drawing.         Application filed February 24, 1912. Serial No. 679,797.

*To all whom it may concern:*

Be it known that I, PER GÖSTA EKSTRÖM, a citizen of the Kingdom of Sweden, residing at Harnäs, Sweden, have invented new and useful Improvements in the Manufacture of Ethyl Alcohol by Fermenting Sulfite Liquor, of which the following is a specification.

It is well known that a good yield in fermentation of saccharine liquids especially very much diluted ones cannot be obtained unless the liquid contains alimentary substances for the yeast, especially nitrogen compounds which may be taken up by the yeast.

This invention consists, chiefly, in using urine as an alimentary substance for the yeast in the fermentation of sulfite liquor for the purpose of producing ethyl alcohol therefrom. Before adding the urine to the sulfite liquor to be fermented I prefer to sterilize the urine by heating it to a suitable temperature, for instance 100° C. The object of such sterilization is to prevent the regular fermentation process from being disturbed by bacteria or similar micro-organisms contained in the natural urine. The quantity of urine used as an addition to the sulfite liquor to be fermented, of course, should be varied according to the concentration of the liquid to be fermented and the quantity of other alimentary substances for the yeast already contained therein. I have obtained good results in using about 3 liters of urine per 1,000 liters of the usual sulfite liquor drawn off from the boilers.

What I claim as new and desire to secure by Letters Patent of the United States, is:

In fermenting sulfite liquor for the purpose of manufacturing ethyl alcohol therefrom the addition of urine to the liquid to be fermented, substantially as and for the purpose set forth.

In testimony that I claim the foregoing as my invention, I have signed my name in presence of two subscribing witnesses.

PER GÖSTA EKSTRÖM.

Witnesses:
    LOU DELMAR,
    JOHN DELMAR.